(12) United States Patent
Harrison

(10) Patent No.: US 11,428,815 B2
(45) Date of Patent: Aug. 30, 2022

(54) NON-LINE-OF-SIGHT CORRECTION FOR TARGET DETECTION AND IDENTIFICATION IN POINT CLOUDS

(71) Applicant: Metawave Corporation, Palo Alto, CA (US)

(72) Inventor: Matthew Harrison, Palo Alto, CA (US)

(73) Assignee: Metawave Corporation, Carlsbad, CA (US)

( * ) Notice: Subject to any disclaimer, the term of this patent is extended or adjusted under 35 U.S.C. 154(b) by 466 days.

(21) Appl. No.: 16/403,458

(22) Filed: May 3, 2019

(65) Prior Publication Data

US 2019/0339349 A1  Nov. 7, 2019

Related U.S. Application Data

(60) Provisional application No. 62/666,666, filed on May 3, 2018.

(51) Int. Cl.
*G01S 17/89* (2020.01)
*G01S 5/02* (2010.01)
*G01S 5/14* (2006.01)

(52) U.S. Cl.
CPC .............. *G01S 17/89* (2013.01); *G01S 5/021* (2013.01); *G01S 5/0252* (2013.01); *G01S 5/14* (2013.01)

(58) Field of Classification Search
CPC ......... G01S 17/89; G01S 17/894; G01S 5/021

USPC ........................................................ 342/458
See application file for complete search history.

(56) References Cited

U.S. PATENT DOCUMENTS

| | | | |
|---|---|---|---|
| 6,492,949 B1 | 12/2002 | Breglia et al. | |
| 10,205,457 B1 | 2/2019 | Josefsberg et al. | |
| 10,593,042 B1 * | 3/2020 | Douillard | G06K 9/34 |
| 2018/0026356 A1 * | 1/2018 | Schmalenberg | H01Q 21/064 |
| | | | 343/713 |

OTHER PUBLICATIONS

S. Patole, et al., "Automotive Radars: A Review of Signal Processing Techniques," Signal Processing for Smart Vehicle Technologies: Part 2, IEEE Signal Processing Magazine, pp. 22-35, Mar. 2017.
L. Danielsson, "Tracking and radar sensor modelling for automotive safety systems," Doctoral thesis, Department of Signals and Systems, University of Technology, Goeteborg, Sweden, pp. 1-120, 2010.
U. Kuhnau, "Sensor Development for Autonomous Driving," pp. 1-26, Feb. 2017.

(Continued)

*Primary Examiner* — Harry K Liu
(74) *Attorney, Agent, or Firm* — Sandra Lynn Godsey

(57) ABSTRACT

Examples disclosed herein relate to an autonomous driving system in a vehicle having a radar system with a Non-Line-of-Sight ("NLOS") correction module to correct for NLOS reflections prior to the radar system identifying targets in a path and a surrounding environment of the vehicle, and a sensor fusion module to receive information from the radar system on the identified targets and compare the information received from the radar system to information received from at least one sensor in the vehicle.

20 Claims, 7 Drawing Sheets

(56) References Cited

OTHER PUBLICATIONS

S. Jeong, et al., "A Multi-Beam and Multi-Range Radar With FMCW and Digital Beam Forming for Automotive Applications," vol. 124, Department of Radar Research & Development, MANDO Electronics Laboratory, Seongnam-si, Korea, pp. 286-299, 2012.
J. Ahtiainen et al., "Radar based detection and tracking of a walking human," Espoo, Finland, pp. 1-6, 2010.
A. Milella et al., "Adaptive Multi-sensor Perception for Driving Automation in Outdoor Contexts," Bari, Italy, pp. 1-16, Aug. 7, 2014.
H. Zhou et al., "Evolution of Satellite Communication Antennas on Mobile Ground Terminals," International Journal of Antennas and Propagation, vol. 2015, Jul. 2015.
R. Rouveure, et al., "Radar Imager for Perception and Mapping in Outdoor Environments," Advanced Concepts for Intelligent Vision Systems: 11th International Conference (ACIVS), Bordeaux, France, pp. 618-628, Sep. 2009.
C. Jacobs, "Game-Changing Solutions to Next-Generation Automotive RADAR," Wolfsburg, Germany, pp. 1-17, Mar. 23, 2017.
S. Carpenter, "Autonomous Vehicle Radar: Improving Radar Performance with Simulation," White Paper, ANSYS, Canonsburg, PA, pp. 1-14, 2017.
G. Reina, et al., "Short-Range Radar Perceptionin Outdoor Environments," Department of Engineering for Innovation, University of Salento, Lecce, Italy, pp. 265-276, 2011.
O' Donnell "Introduction to Radar Systems The Radar Equation," Massachusetts, United States, pp. 1-35, Jun. 13, 2002.
J. Leonard, et al., "A Perception-Driven Autonomous Urban Vehicle," In: Buehler M., Iagnemma K., Singh S. (eds), The DARPA Urban Challenge, Springer Tracts in Advanced Robotics, Berlin, Heidelberg, vol. 56, pp. 163-230, 2009.
G. Reina, et al., "A Self-Learning Ground Classifier using RadarFeatures," pp. 1-14, Dec. 16, 2014.
S. Park, et al., "A Neural Network Approach to Target Classification for Active Safety System Using Microwave Radar," Expert Systems with Applications, Elsevier, vol. 37, Issue 3, pp. 2340-2346, Mar. 2010.
T. Matthias, et al., "Radar Sensors and Sensor Platform used for Pedestrian Protection in the EC-funded project SAVE-U," Jul. 2004, Siemens VDO Automotive, Regensburg, Germany, pp. 1-7, Dec. 2009.
M. M. Tutusaus, "Evaluation of Automotive Commercial Radar for Human Detection," Helsinki University of Technology, pp. 1-75, Nov. 17, 2008.
J. Schoebel, et al., "Planar Antenna Technology for mm-Wave Automotive Radar, Sensing, and Communications," Radar Technology, Book edited by: Dr. Guy Kouemou, In Tech, Ch 15, pp. 298-319, Jan. 2010.
S. Haykin, "Radar Vision," Ontario, Canada, pp. 585-588, 1990.
T. Wang, et al., "Integrating Millimeter Wave Radar with a Monocular Vision Sensor for On-Road Obstacle Detection Applications," Xi'an, China, pp. 8993-9008, Sep. 21, 2011.
F. Ramian, et al., "Automotive Radar Imaging Using Noncoherent Sensors," Fachgebiet Höchstfrequenztechnik, Technische Universität München, 110 pages.

\* cited by examiner

NON-LINE-OF-SIGHT CORRECTION FOR TARGET DETECTION AND IDENTIFICATION IN POINT CLOUDS

CROSS-REFERENCE TO RELATED APPLICATIONS

This application claims priority to U.S. Provisional Application No. 62/666,666, filed on May 3, 2018, and incorporated herein by reference in their entirety.

BACKGROUND

Autonomous driving is quickly moving from the realm of science fiction to becoming an achievable reality. Already in the market are Advanced-Driver Assistance Systems ("ADAS") that automate, adapt and enhance vehicles for safety and better driving. The next step will be vehicles that increasingly assume control of driving functions such as steering, accelerating, braking and monitoring the surrounding environment and driving conditions to respond to events, such as changing lanes or speed when needed to avoid traffic, crossing pedestrians, animals, and so on. The requirements for object and image detection are critical and specify the time required to capture data, process it and turn it into action. All this while ensuring accuracy, consistency and cost optimization.

An aspect of making this work is the ability to detect and classify objects in the surrounding environment at the same or possibly even better level as humans. Humans are adept at recognizing and perceiving the world around them with an extremely complex human visual system that essentially has two main functional parts: the eye and the brain. In autonomous driving technologies, the eye may include a combination of multiple sensors, such as camera, radar, and lidar, while the brain may involve multiple artificial intelligence, machine learning and deep learning systems. The goal is to have full understanding of a dynamic, fast-moving environment in real time and human-like intelligence to act in response to changes in the environment.

BRIEF DESCRIPTION OF THE DRAWINGS

The present application may be more fully appreciated in connection with the following detailed description taken in conjunction with the accompanying drawings, which are not drawn to scale and in which like reference characters refer to like parts throughout, and wherein.

DETAILED DESCRIPTION

Systems and methods for Non-Line-of-Sight ("NLOS") correction for target detection in point clouds are disclosed. The systems and methods are suitable for many different applications and can be deployed in a variety of different environments and configurations. In various examples, the systems and methods are used in a radar system in an autonomous driving vehicle to identify and classify objects in the surrounding environment in all-weather conditions and beyond line-of-sight. The targets may include structural elements in the environment such as roads, walls, buildings, road center medians and other objects, as well as vehicles, pedestrians, bystanders, cyclists, animals and so on. The point cloud is generated by an imaging sensor or detecting device, such as a camera, a radar, a lidar or other device, and contain data representing targets captured by the detecting device.

As described in more detail below, the radar system in various examples has a meta-structure ("MTS") antenna capable of steering beams with controllable parameters in any desired direction in a 360° field of view. The radar system has a Perception Module that provides control of the MTS antenna in response to a detected and identified target in the surrounding environment. This enables the radar system to provide a dynamically controllable and steerable antenna beam that can focus on one or multiple portions within a 360° field of view, while optimizing the antenna capabilities and reducing the processing time and computational complexity for identification of objects therein.

It is appreciated that, in the following description, numerous specific details are set forth to provide a thorough understanding of the examples. However, it is appreciated that the examples may be practiced without limitation to these specific details. In other instances, well-known methods and structures may not be described in detail to avoid unnecessarily obscuring the description of the examples. Also, the examples may be used in combination with each other.

Figure 1:
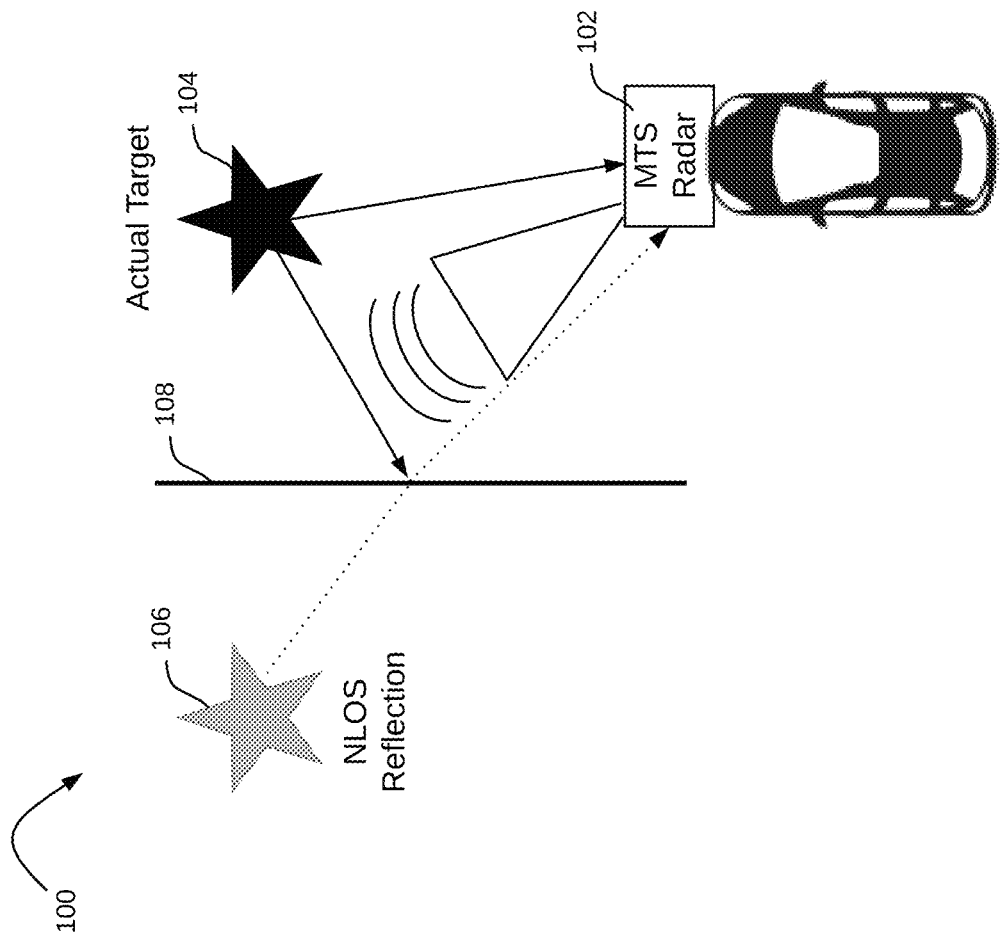
FIG. 1 is a schematic diagram showing a radar being used to identify targets in its surrounding environment.

Referring now to FIG. 1, a schematic diagram of a radar being used to identify targets in its surrounding environment is described. MTS radar system 102 transmits RF waves with a MTS antenna that get reflected off of targets and other objects in environment 100. In various examples, MTS radar 102 may be part of an autonomous driving system in a vehicle to identify targets in the vehicle's path and in its surrounding environment. An actual target 104 is positioned as shown and reflects the RF waves back to the MTS radar 102. Due to multi-path propagation of the reflected waves, MTS radar 102 may perceive an NLOS reflection 106 of the actual target 104 about a planar reflecting surface 108. The MTS radar 102 may perceive the NLOS reflection 106 as an actual target rather than a reflection of the actual target 104, thereby causing the autonomous driving system to incorrectly detect a target. As described below, the systems and methods disclosed herein enable the autonomous driving system to identify the planar reflecting surface 108 as a planar surface and correctly localize it relative to the actual target 104 and its NLOS reflection 106.

Figure 2:
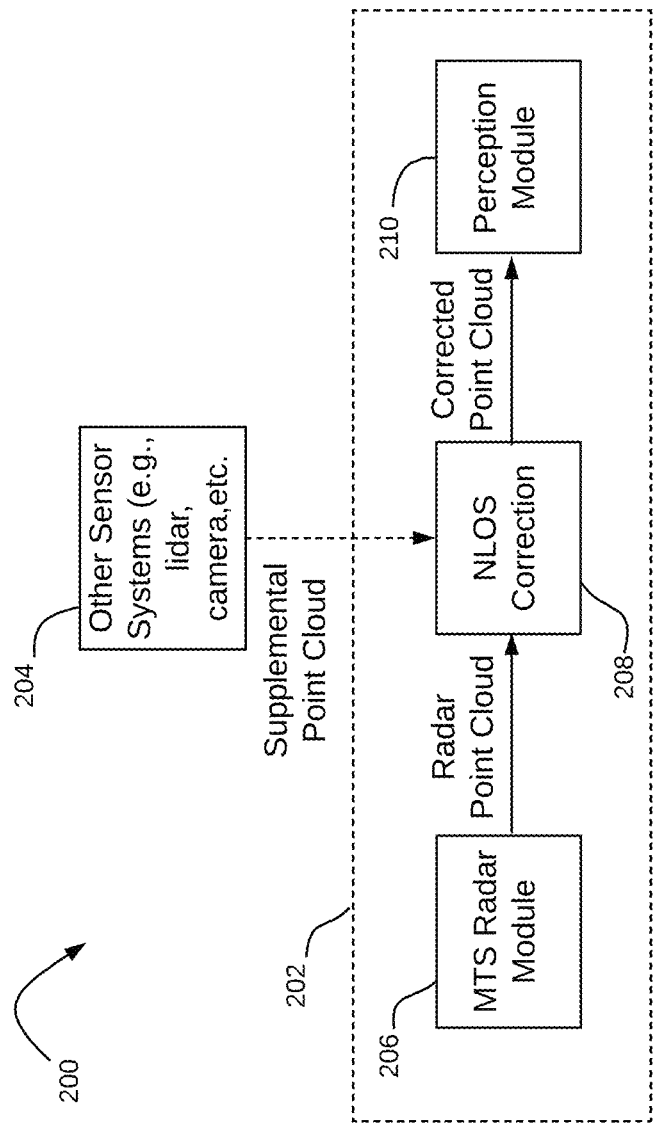
FIG. 2 is a schematic diagram of a radar in an autonomous driving system in accordance with various examples.

Attention is now directed to FIG. 2, which shows a schematic diagram of a radar in an autonomous driving system in accordance with various examples. Autonomous driving system 200 includes an intelligent radar system 202 and other sensor systems 204 such as camera, lidar sensors, environmental sensors, operational sensors, and so on. Intelligent radar system 202 has MTS Radar Module 206 to gather a point cloud S of data representing targets in the path of a vehicle with autonomous driving system 200 and in its surrounding environment. Each point in the cloud has a location (x, y, z) and a brightness B, as well as velocity information. The values of $\vec{r}=(x, y, z)$ are determined by radar processing (i.e., by acquiring range and azimuth and elevation information at the time of capture) and simply transforming these values into cartesian coordinates.

As discussed above with reference to FIG. 1, for some elements of 5, target identification may be confounded by NLOS reflections of targets about a planar reflecting surface. A NLOS correction module 208 is introduced as a preprocessing step in the intelligent radar system 202 to generate a corrected point cloud that is fed into Perception Module 210 for accurate identification of targets. In various examples, other sensor systems 204 (e.g., cameras, lidar sensors, etc.) may be used to provide a supplemental point cloud to NLOS correction module 208 for enhanced correction of NLOS reflections.

Figure 3:
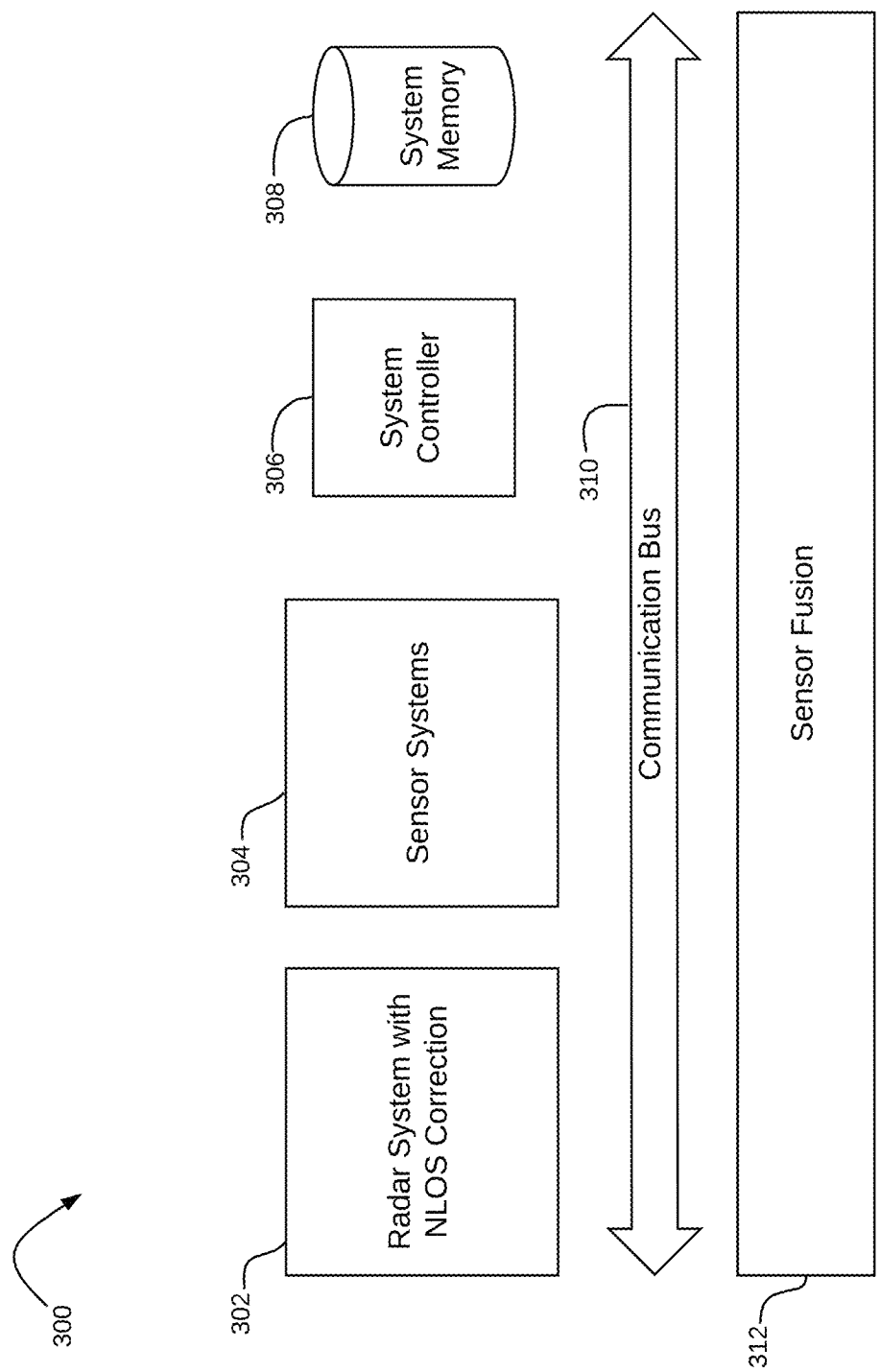
FIG. 3 is a schematic diagram of an autonomous driving system in accordance with various examples.

FIG. 3 is a schematic diagram of an autonomous driving system in accordance with various examples. Autonomous driving system 300 is a system for use in a vehicle that provides some or full automation of driving functions. The driving functions may include, for example, steering, accelerating, braking and monitoring the surrounding environment and driving conditions to respond to events, such as changing lanes or speed when needed to avoid traffic, crossing pedestrians, animals, and so on. Autonomous driving system 300 includes a radar system with a NLOS correction module 302, sensor systems 304, system controller 306, system memory 308, communication bus 310 and sensor fusion 312. It is appreciated that this configuration of autonomous driving system 300 is an example and is not meant to be limiting to the specific structure illustrated in FIG. 3. Additional systems and modules not shown in FIG. 3 may be included in autonomous driving system 300.

Radar system with NLOS correction module 302 includes an MTS antenna for providing dynamically controllable and steerable beams that can focus on one or multiple portions within a 360° field of view. The beams radiated from the MTS antenna are reflected back from targets in the vehicle's surrounding environment and received and processed by the radar system 302 to detect and identify the targets. As generally used herein, the targets may include structural elements in the environment such as walls, buildings, road center medians, and other objects, as well as vehicles, pedestrians, bystanders, cyclists, animals and so on. The radar system 302 has a reinforcement learning engine that is trained to detect and identify the targets and control the MTS antenna module as desired.

Sensor systems 304 may include multiple sensors in the vehicle, such as cameras, lidar, ultrasound, communication sensors, infrastructure sensors and other sensors to determine a condition of the surrounding environment and in particular, to comprehend the path of the vehicle so as to anticipate, identify and detect the presence of a target in the vehicle's path. Data from radar system 302 and sensor systems 304 may be combined in sensor fusion module 312 to improve the target detection and identification performance of autonomous driving system 300. Sensor fusion module 312 is controlled by system controller 306, which may also interact with and control other modules and systems in the vehicle. For example, system controller 306 may turn the different sensors in sensor systems 304 on and off as desired, or provide instructions to the vehicle to stop upon identifying a driving hazard (e.g., deer, pedestrian, cyclist, or another vehicle suddenly appearing in the vehicle's path, flying debris, etc.)

All modules and systems in autonomous driving system 300 communicate with each other through communication bus 310. Autonomous driving system 300 also includes system memory 308, which may store information and data (e.g., static and dynamic data) used for operation of system 300 and the vehicle using system 300.

Figure 4:
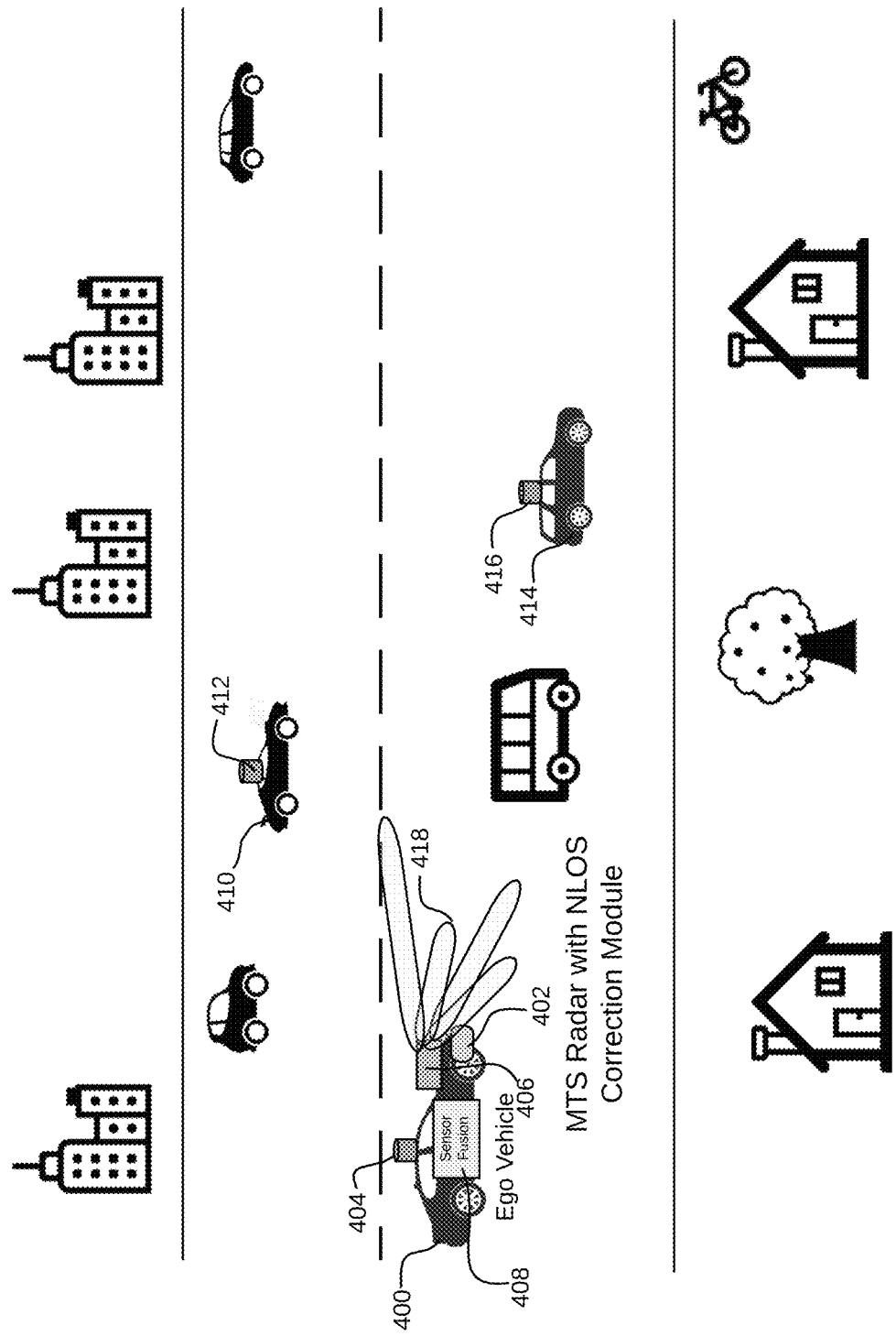
FIG. 4 illustrates an example environment in which an autonomous vehicle with the system of FIGS. 2 and 3 is used to detect and identify objects.

FIG. 4 illustrates an example environment in which an autonomous vehicle with the systems of FIGS. 2 and 3 is used to detect and identify objects. Vehicle 400 is an autonomous vehicle with an MTS radar system 406 for transmitting a radar signal to scan a FoV or specific area. In various examples, the radar signal is transmitted according to a set of scan parameters that can be adjusted to result in multiple transmission beams 418. The scan parameters may include, among others, the total angle of the scanned area from the radar transmission point, the power of the transmitted radar signal, the scan angle of each incremental transmission beam, as well as the angle between each beam or overlap therebetween. The entire FoV or a portion of it can be scanned by a compilation of such transmission beams 418, which may be in successive adjacent scan positions or in a specific or random order. Note that the term FoV is used herein in reference to the radar transmissions and does not imply an optical FoV with unobstructed views. The scan parameters may also indicate the time interval between these incremental transmission beams, as well as start and stop angle positions for a full or partial scan.

In various examples, the vehicle 400 may also have other perception sensors, such as camera 402 and lidar 404. These perception sensors are not required for the vehicle 400, but may be useful in augmenting the object detection capabilities of the radar system 406, which has a NLOS correction module for enhanced correction of NLOS reflections and a reinforcement learning engine that is trained to detect and identify targets in the path and surrounding path of the vehicle, such as vehicles 410 and 414, which in this illustrated example are autonomous vehicles equipped with lidars 412 and 416, respectively.

In various examples and as described in more detail below, the MTS radar system 406 is capable of providing a 360° true 3D vision and human-like interpretation of the vehicle's path and surrounding environment. The radar system 406 is capable of shaping and steering RF beams in all directions in a 360° FoV with at least one beam steering antenna. This enables the radar system 406 to recognize objects quickly and with a high degree of accuracy over a long range of around 300 meters or more. The short range capabilities of camera 402 and lidar 404 along with the long range capabilities of radar 406 enable a sensor fusion module 408 in vehicle 400 to advance the possibility of fully self-driving cars. The object detection and identification performance provided by the reinforcement learning engine in radar system 406 can be used to reduce or minimize the scan performance of the radar system 406, as the engine enables objects to be detected and identified with less stringent scan parameters for the radar 406 as it would otherwise be needed. Further, the use of the NLOS correction module enables an enhanced correction of NLOS reflections that further improves the object detection and identification performance of the radar system 406.

Figure 5:
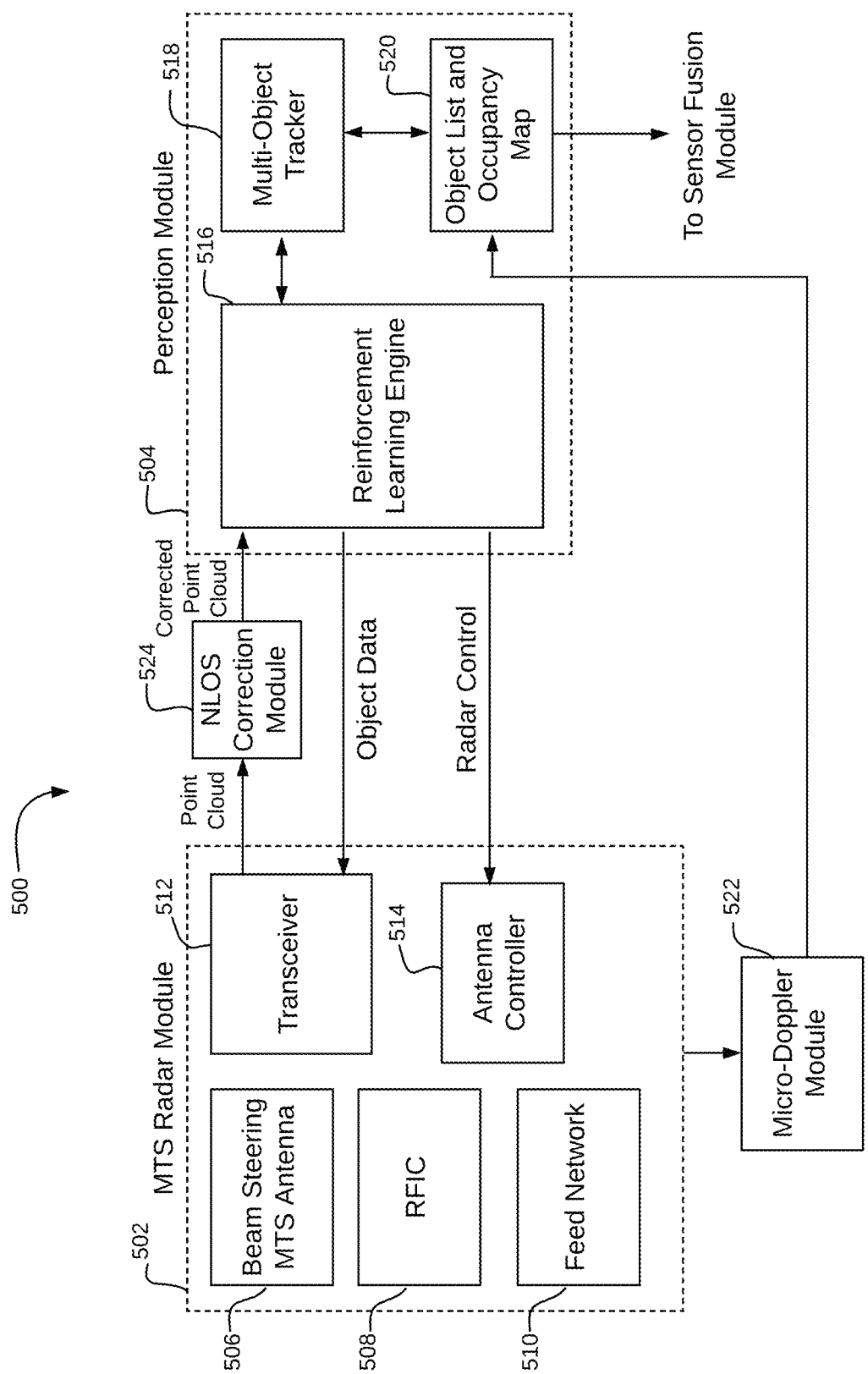
FIG. 5 is a schematic diagram of a radar system with a NLOS correction module for use in the autonomous driving system of FIG. 3 in accordance with various examples.

Attention is now directed to FIG. 5, which illustrates a schematic diagram of a radar system with a NLOS correction module for use in the autonomous driving system of FIG. 3 in accordance with various examples. Radar system 500 is a "digital eye" with true 3D vision and capable of a human-like interpretation of the world. The "digital eye" and human-like interpretation capabilities are provided by two main modules: MTS Radar Module 502 and Perception Module 504.

MTS radar module 502 includes at least one beam steering antenna 506 for providing dynamically controllable and steerable beams that can focus on one or multiple portions of a 360° FoV of a vehicle. In various examples, the beam steering antenna is an MTS antenna capable of radiating RF signals in millimeter wave frequencies. A meta-structure, as generally defined herein, is an engineered, non- or semi-periodic structure that is spatially distributed to meet a specific phase and frequency distribution. The meta-structure antenna may be integrated with various structures and layers, including, for example, feed network or power division layer 510 to divide power and provide impedance matching, RFIC 508 to provide steering angle control and other functions, and a meta-structure antenna layer with multiple microstrips, gaps, patches, vias, and so forth. The meta-structure layer may include, for example, a metamaterial layer. Various configurations, shapes, designs and dimensions of the beam steering antenna 506 may be used to implement specific designs and meet specific constraints.

Radar control is provided in part by the perception module 504. Radar data generated by the radar module 502 is provided to the perception module 504 for object detection and identification. The radar data is acquired by the transceiver 512, which has a radar chipset capable of transmitting the RF signals radiated by the beam steering antenna 506 and receiving the reflections of these RF signals. The transceiver module 512 prepares a signal for transmission, such as a signal for a radar device, wherein the signal is defined by modulation and frequency. The signal is provided to the beam steering antenna 506 through a coaxial cable or other connector and propagates through the structure for transmission through the air via RF beams at a given phase, direction, and so on. The RF beams and their parameters (e.g., beam width, phase, azimuth and elevation angles, etc.) are controlled by antenna controller 514, such as at the direction of perception module 504.

The RF beams reflect off of targets in the surrounding environment and the RF reflections are received by the transceiver module 512. Radar data from the received RF beams is provided to the perception module 504 for target detection and identification. The radar data may be organized in sets of Range-Doppler ("RD") map information, corresponding to 4D information that is determined by each RF beam radiated off targets, such as azimuthal angles, elevation angles, range and velocity. The RD maps are extracted from frequency-modulated continuous wave ("FMCW") radar pulses and they contain both noise and systematic artifacts from Fourier analysis of the pulses. The perception module 504 controls further operation of the radar module 502 by, for example, providing beam parameters for the next RF beams to be radiated from MTS radiating cells in the beam steering antenna 506.

In various examples, the transmission signals sent by transceiver module 512 are received by a portion, or sub-array, of beam steering antenna 506, which is an array of individual MTS radiating cells (e.g., an 8×16 array), wherein each of the cells has a uniform size and shape. In some examples, the MTS radiating cells may incorporate different sizes, shapes, configurations and array sizes. The MTS radiating cells include a variety of conductive structures and patterns, such that a received transmission signal is radiated therefrom. The MTS array in antenna 506 is a periodic arrangement of MTS cells that are each smaller than the transmission wavelength.

In some examples, the MTS cells may be metamaterial ("MTM") cells. Each MTM cell has some unique properties. These properties may include a negative permittivity and permeability resulting in a negative refractive index; these structures are commonly referred to as left-handed materials ("LHM"). The use of LHM enables behavior not achieved in classical structures and materials, including interesting effects that may be observed in the propagation of electromagnetic waves, or transmission signals. Metamaterials can be used for several interesting devices in microwave and terahertz engineering such as antennas, sensors, matching networks, and reflectors, such as in telecommunications, automotive and vehicular, robotic, biomedical, satellite and other applications. For antennas, metamaterials may be built at scales much smaller than the wavelengths of transmission signals radiated by the metamaterial. Metamaterial properties come from the engineered and designed structures rather than from the base material forming the structures. Precise shape, dimensions, geometry, size, orientation, arrangement and so forth result in the smart properties capable of manipulating EM waves by blocking, absorbing, enhancing, or bending waves.

In operation, the antenna controller 514 is responsible for directing the beam steering antenna 506 to generate RF beams with determined parameters such as beam width, transmit angle, and so on. The antenna controller 514 may, for example, determine the parameters at the direction of the perception module 504, which may at any given time want to focus on a specific area of a field of view upon identifying targets of interest in the vehicle's path. The antenna controller 514 determines the direction, power, and other parameters of the beams and controls the beam steering antenna 506 to achieve beam steering in various directions. The antenna controller 514 also determines a voltage matrix to apply to RFIC 508 to achieve a given phase shift. The radar perception module 404 provides control actions to the antenna controller 514 at the direction of Reinforcement Learning Engine 516.

Next, the antenna 506 radiates RF beams having the determined parameters. The RF beams are reflected off of targets in and around the vehicle's path (e.g., in a 360° field of view) and are received by the transceiver module 512 in the MTS radar module 502. The MTS radar module 502 then transmits a point cloud containing 4D radar data to the NLOS correction module 524 for generating a corrected point cloud that is then sent to the perception module 504. A micro-doppler module 522 coupled to the MTS radar module 502 and the perception module 504 extracts micro-doppler signals from the 4D radar data to aid in the identification of targets by the perception module 504. The micro-doppler module 522 takes a series of RD maps from the MTS radar module 502 and extracts a micro-doppler signal from them. The micro-doppler signal enables a more accurate identification of targets as it provides information on the occupancy of a target in various directions.

The reinforcement learning engine 516 receives the corrected point cloud from the NLOS correction module 524, processes the radar data to detect and identify targets, and determines the control actions to be performed by the MTS radar module 502 based on the detection and identification of such targets. For example, the reinforcement learning engine 516 may detect a cyclist on the path of the vehicle and direct the MTS radar module 502, at the instruction of its antenna controller 514, to focus additional RF beams at given phase shift and direction within the portion of the field of view corresponding to the cyclist's location.

The perception module 504 also includes a multi-object tracker 518 to track the identified targets over time, such as, for example, with the use of a Kalman filter. Information on identified targets over time are stored at an object list and occupancy map 520, which keeps tracks of targets' locations and their movement over time as determined by the multi-object tracker 518. The tracking information provided by the multi-object tracker 518 and the micro-doppler signal provided by the micro-doppler module 522 are combined to produce an output containing the type of target identified, their location, their velocity, and so on. This information from radar system 500 is then sent to a sensor fusion module such as sensor fusion module 312 of FIG. 3, where it is processed together with object detection and identification from other sensors in the vehicle.

Figure 6:
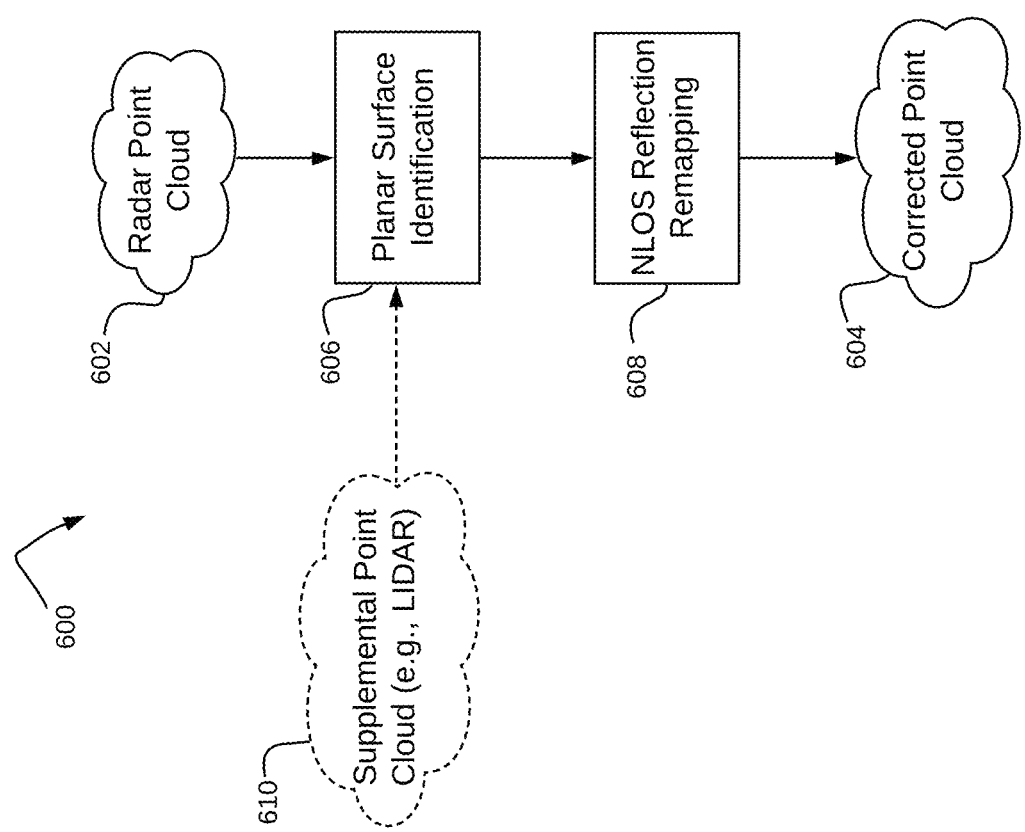
FIG. 6 is a schematic diagram illustrating the two main stages of a NLOS correction module for use in a radar in an autonomous driving system.

FIG. 6 illustrates the two main stages of a NLOS correction module for use in a radar in an autonomous driving system, e.g., NLOS correction module 524 in radar 500 of FIG. 5. NLOS correction module 600, implemented as in NLOS correction module 208 of FIG. 2, NLOS correction module in radar system 302 of FIG. 3 or NLOS correction module 524 in radar system 500 of FIG. 5, receives a radar point cloud 602 and generates a corrected point cloud 604 to properly account for NLOS reflections of actual LOS targets and provide an accurate localization of NLOS targets. NLOS correction module 600 has in essence two tasks to perform: for all points $s_i \in S$, (1) is $s_i$ the result of a reflection from a planar reflecting surface? (2) If so, where is the true location of the target corresponding to $s_i$?

The first task is performed by Planar Surface Identification Module 606, which locates all significant planar reflecting surfaces in the field of view of the radar system incorporating NLOS correction module 600. Once the plane reflecting surfaces are located, the second task is performed by NLOS Reflection Remapping Module 608, which remaps the NLOS reflections of a target about the identified planar reflecting surfaces to determine a best estimate of its true location.

Note that the planar surface identification module 606 may also receive a supplemental point cloud 610, e.g., a lidar point cloud, to aid in the identification of the planar reflecting surfaces. The planar surface identification module 606 may, for example, identify the planar reflecting surfaces in the supplemental point cloud 610 and then remap the NLOS reflections in NLOS reflection remapping module 608 in the radar point cloud 602. Alternatively, the identification of the planar reflecting surfaces may be performed with the radar point cloud 602 using the supplemental point cloud 610 to verify that the planar reflecting surfaces were located correctly. The vice-versa scenario may also be used, with the supplemental point cloud 610 providing the data for the identification and the radar point cloud 602 providing the data to confirm that the identification is correct. Further, the identification may be performed in both of point clouds 602 and 610 and the results may be compared to determine the planar reflecting surface locations. It is appreciated that a number of point clouds may be used in this identification of planar reflecting surfaces by planar surface identification module 606. The NLOS reflection remapping module 608 remaps the NLOS reflections about the identified planar reflecting surfaces using the radar point cloud 602.

Figure 7:
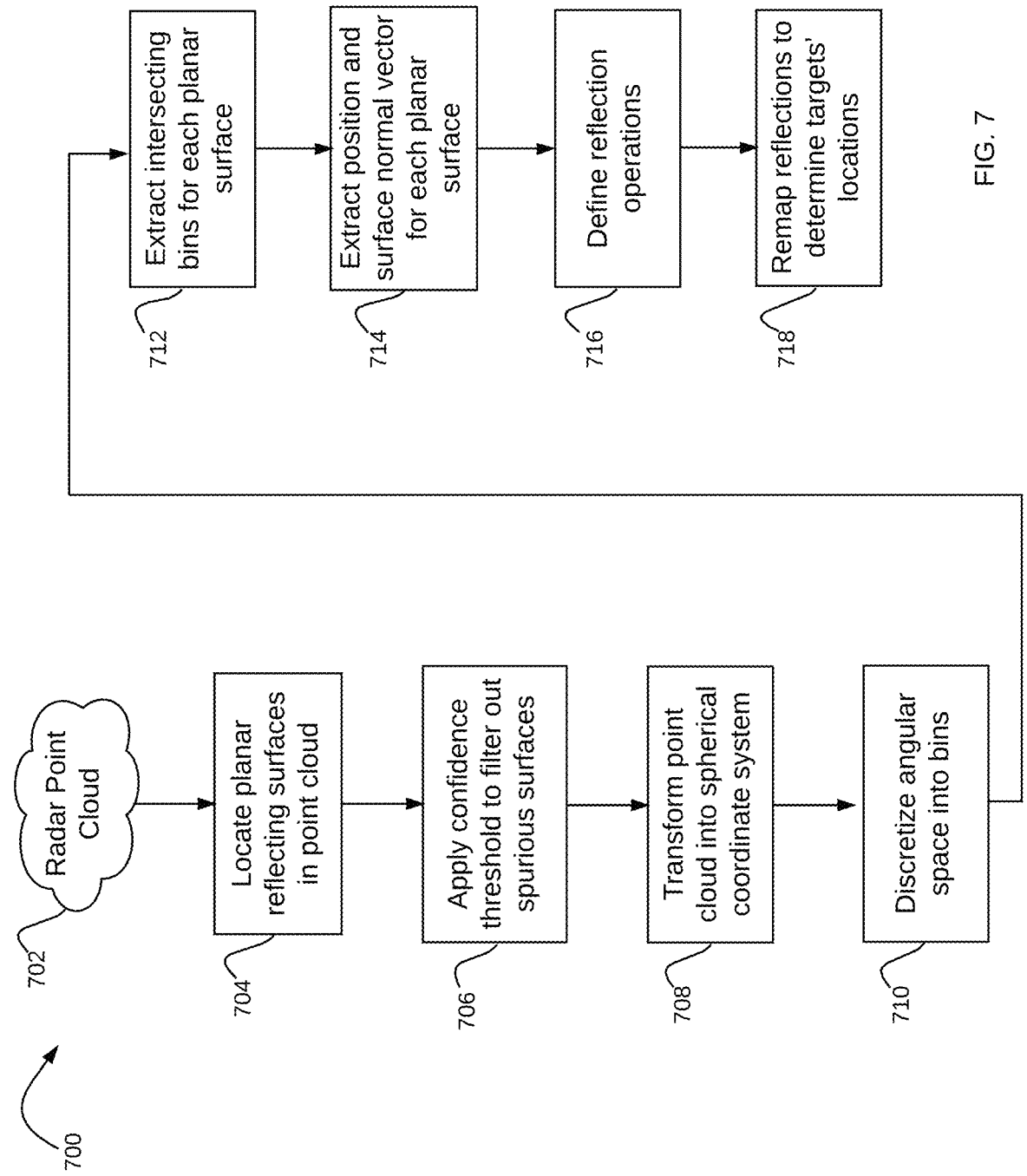
FIG. 7 is a flowchart illustrating the operation of the NLOS correction module of FIG. 6.

Attention is now directed to FIG. 7, which illustrates the operation of the NLOS correction module of FIG. 6 in more detail. NLOS correction module 700 starts out by applying the planar identification module 706 to a point cloud S (704). The point cloud may be a radar point cloud such as radar point cloud 702 or a supplemental point cloud. Alternatively, both point clouds may be used to generate two results that are compared. In various examples, planar surface identification module 606 implements a 3D Kernel-Based Hough Transform ("3DKHT") to detect the planar reflecting surfaces from the point cloud. The result of the 3DKHT application to a point cloud S is a list of L candidate planar surfaces with corresponding locations, orientations, and confidence estimates.

Candidate planar surfaces are compared to a confidence brightness threshold to indicate when there truly is a significant planar surface in the field of view. The spurious surfaces, i.e., candidate surfaces that are below the confidence brightness threshold, are then discarded (706). In general, the cost for false negative results (failing to predict a planar reflecting surface when in fact one exists) is much lower than the cost for false positives (predicting a reflection where none exists). Due to the high cost of false positives, it is likely that the confidence brightness threshold may be set high.

With the planar reflecting surfaces now identified, the point cloud S is transformed into a spherical coordinate system centered on the radar itself (708). The angular space of the point cloud S, i.e., the azimuth and elevation angles $(\phi,\theta)$, is discretized into $k^2$ bins (710). For each of the L planar surfaces, NLOS correction module 600 proceeds to extract the bins that the planar surface intersects (712). The planar surface's position and its surface normal vector are also extracted (714). If two planar surfaces intersect the same bin, the more distance surface is ignored. For discussion and illustration purposes, consider that the L planar surfaces intersect M bins. The surface positions of the identified L planar surfaces in each bin intersection and their surface normal vector define M different reflection operations about the relevant surfaces (716). For each affected bin, the coordinates of the points in S whose distance from the radar exceeds the distance from the radar to the intersecting plane are then remapped by a reflection about the intersecting plane to locate the targets (718).

Note that this reflection operation can be defined in O(1) for each bin and performed in O(n) where n is the number of points to be reflected. Since each bin is expected to have on average $N/k^2$ points, and M $\alpha$ $Lk^2$, the entire reflection operation is expected to scale as $LMN/k^2 \cong LN$. If the confidence brightness threshold is kept high, there will not be an enormous number of planar surfaces, and so this scaling will be fine. Note also that the 3DKHT implementation for the planar surface identification module 706 is a deterministic method of planar Hough transformation which runs in N log N. The 3DKHT implementation has low enough computational and memory cost to be feasible on inexpensive hardware in real time. It is appreciated that other implementations for identifying planar reflecting surfaces may also be used by Planar Surface Identification Module 306.

It is also appreciated that there may a fair amount of trial and error in determining the proper confidence brightness threshold. One approach is to simplify the planar identification by looking first for horizontal planes. Further accuracy can be obtained by filtering out points due to targets with a non-zero velocity relative to a road, since they definitely do not correspond to a fixed planar surface. Such implementation may be used for example to image the back of a vehicle two places ahead of the autonomous driving vehicle in a line of cars, or image vehicles moving behind a line of stopped cars.

The various examples described herein support autonomous driving with improved sensor performance, all-weather/all-condition detection, advanced decision-making algorithms and interaction with other sensors through sensor fusion. These configurations optimize the use of radar sensors, as radar is not inhibited by weather conditions in many applications, such as for self-driving cars. The ability to capture environmental information early aids control of a vehicle, allowing anticipation of hazards and changing conditions. Sensor performance is also enhanced with these structures, enabling long-range and short-range visibility. In an automotive application, short-range is considered within 30 meters of a vehicle, such as to detect a person in a cross walk directly in front of the vehicle; and long-range is considered to 250 meters or more, such as to detect approaching cars on a highway. These examples provide automotive radars capable of reconstructing the world around them and are effectively a radar "digital eye," having true 3D vision and capable of human-like interpretation of the world.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. An autonomous driving system in a vehicle, comprising:
    a radar system comprising a Non-Line-of-Sight ("NLOS") correction module configured to correct for NLOS reflections prior to the radar system identifying targets in a path and a surrounding environment of the vehicle, wherein the NLOS correction module comprises a planar surface identification module configured to locate at least one planar reflecting surface in a field of view of the radar system; and
    a sensor fusion module to receive information from the radar system on the identified targets and compare the information received from the radar system to information received from at least one sensor in the vehicle.

2. The autonomous driving system of claim 1, wherein the radar system further comprises a beam steering meta-structure antenna having an array of radiating meta-structure cells.

3. The autonomous driving system of claim 1, wherein the at least one sensor comprises at least one of a camera or a lidar.

4. The autonomous driving system of claim 1, wherein the NLOS correction module is further configured to receive a point cloud from the radar system and generate a corrected point cloud.

5. The autonomous driving system of claim 1, wherein the NLOS correction module receives a supplemental point cloud from the at least one sensor in the vehicle.

6. The autonomous driving system of claim 1, wherein the planar surface identification module identifies the at least one planar reflecting surface using the supplemental point cloud.

7. The autonomous driving system of claim 1, wherein the NLOS correction module further comprises a reflection remapping module configured to remap the NLOS reflections about the at least one planar reflecting surface.

8. The autonomous driving system of claim 4, wherein the planar surface identification module comprises a Kernel-Based Hough Transform and is further configured to detect the at least one planar reflecting surface from the point cloud.

9. A radar system, comprising:
    a radar module having a meta-structure beam steering antenna configured to radiate a plurality of RF beams under control of an antenna controller;
    an NLOS correction module configured to correct for NLOS reflections of targets reflecting the plurality of radiated RF beams;
    a perception module configured to determine a control action for the antenna controller and identify the targets; and
    a transceiver configured to provide radar data from a radar scan to the perception module.

10. The radar system of claim 9, further comprising an RFIC configured to provide steering angle control of the meta-structure beam steering antenna.

11. The radar system of claim 9, wherein the NLOS correction module is further configured to receive a point cloud from the radar data and generate a corrected point cloud.

12. The radar system of claim 11, wherein the perception module identifies the targets from the corrected point cloud.

13. The radar system of claim 9, wherein the NLOS correction module comprises a planar surface identification module configured to locate at least one planar reflecting surface in a field of view of the radar system.

14. The radar system of claim 13, wherein the NLOS correction module further comprises a reflection remapping module configured to remap the NLOS reflections about the at least one planar reflecting surface.

15. A method for operating a radar system in an autonomous driving system, the method comprising:
    directing a meta-structure antenna to generate RF beams at a plurality of directions in a field of view of the autonomous driving system;
    receiving reflected RF beams from targets in the field of view;
    generating a point cloud;
    correcting for Non-Line-of-Sight ("NLOS") reflections in the point cloud;
    generating a corrected point cloud, wherein the correcting comprises locating at least one planar reflecting surface in the field of view; and
    identifying at least one target from the corrected point cloud.

16. The method of claim 15, wherein directing the meta-structure antenna to generate the RF beams at the plurality of directions comprises generating the RF beams at a plurality of phase shifts from an RFIC coupled to the meta-structure antenna.

17. The method of claim 15, wherein correcting for NLOS reflections in the point cloud to generate the corrected point cloud comprises remapping the NLOS reflections about the at least one planar reflecting surface.

18. The radar system of claim 9, wherein the NLOS correction module receives a supplemental point cloud from at least one sensor in the vehicle.

19. The method of claim 15, further comprising:
    receiving a supplemental point cloud from the at least one sensor in the autonomous driving system.

20. The method of claim 19, wherein locating the at least one planar reflecting surface in the field of view comprises identifying the at least one planar reflecting surface using the supplemental point cloud.

* * * * *